United States Patent
Uroz et al.

(10) Patent No.: US 7,672,028 B2
(45) Date of Patent: Mar. 2, 2010

(54) COLOR TARGET LAYOUT

(75) Inventors: Juan Uroz, Terrassa (ES); Jan Morovic, Barcelona (ES); Ezequiel Jordi Rufes, Sant Fellu de Llobregat (ES); Alessandro Orsi, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1069 days.

(21) Appl. No.: 11/238,571

(22) Filed: Sep. 29, 2005

(65) Prior Publication Data

US 2007/0071315 A1 Mar. 29, 2007

(51) Int. Cl.
*H04N 1/46* (2006.01)

(52) U.S. Cl. .................. 358/504; 358/1.9; 382/162; 382/167

(58) Field of Classification Search .............. 358/1.9, 358/504; 382/162, 167
See application file for complete search history.

(56) References Cited

U.S. PATENT DOCUMENTS

| | | | |
|---|---|---|---|
| 5,416,613 A * | 5/1995 | Rolleston et al. ............ 358/518 |
| 6,062,137 A | 5/2000 | Guo et al. | |
| 6,152,444 A | 11/2000 | Elgee et al. | |
| 6,211,970 B1 | 4/2001 | Cornell et al. | |
| 6,249,300 B1 | 6/2001 | Kerr et al. | |
| 6,351,320 B1 | 2/2002 | Shin | |
| 6,431,679 B1 | 8/2002 | Li et al. | |
| 6,655,778 B2 | 12/2003 | Arquilevich et al. | |
| 6,659,578 B2 | 12/2003 | Gudaitis et al. | |
| 6,722,751 B2 | 4/2004 | Barr et al. | |
| 6,764,158 B2 | 7/2004 | Arquilevich et al. | |
| 6,832,824 B1 | 12/2004 | Baker et al. | |
| 6,905,187 B2 | 6/2005 | Arquilevich et al. | |
| 2004/0114164 A1* | 6/2004 | Linder et al. ................. 358/1.9 |
| 2004/0151370 A1* | 8/2004 | Sasaki ......................... 382/162 |
| 2005/0093879 A1* | 5/2005 | Zanghi et al. ................ 345/589 |
| 2005/0128495 A1* | 6/2005 | Arai ............................ 358/1.9 |
| 2005/0231745 A1* | 10/2005 | Kawai et al. ................. 358/1.12 |

OTHER PUBLICATIONS

Navin Chaddha, Wee-Chiew Tan, Teresa H.Y. Meng, Color Quantization of Images Based on Human Vision Perception, 1994, IEEE, pp. V89-V92.*

* cited by examiner

*Primary Examiner*—Mark K Zimmerman
*Assistant Examiner*—Miya J Cato

(57) ABSTRACT

A printer is configured to print a color target that associates colors to which humans are most sensitive to color variance with areas of the color target within which color measurement is less prone to meassurement error. The printer then prints the color target according to the association. In an optional impememenentation, measurements of like color elements within the target are average. In a further optional impementation, the averaging is performed using weighted values, wherein the weighting is based on color measurement accuracy within an area within the color target wherein each measured element is located. In a still further implementation, a color look-up table is generated according to measurements made of the color target.

20 Claims, 5 Drawing Sheets
(1 of 5 Drawing Sheet(s) Filed in Color)

200

202 ASSOCIATE COLORS TO WHICH HUMANS ARE MOST SENSITIVE TO COLOR VARIANCE WITH AREAS OF A COLOR TARGET WITHIN WHICH COLOR MEASUREMENT IS LESS PRONE TO MEASUREMENT ERROR

> 204 UTILIZE DATA WHICH RANKS COLORS BASED UPON A DEGREE TO WHICH HUMAN VISION CAN DETECT COLOR VARIANCE
>
> 206 UTILIZE DATA WHICH RANKS AREAS WITHIN THE COLOR TARGET BASED UPON A DEGREE OF ACCURACY BY WHICH COLOR MEASUREMENT MAY BE PERFORMED

208 PRINT THE COLOR TARGET ACCORDING TO THE ASSOCIATION

> 210 PRINT COLORS TO WHICH HUMANS ARE MORE SENSITIVE TO COLOR VARIANCE IN LOCATIONS WITHIN THE COLOR TARGET WHEREIN COLOR MEASUREMENT CAN BE MORE ACCURATELY PERFORMED
>
> 212 PRINT COLORS TO WHICH HUMANS ARE LESS SENSITIVE TO COLOR VARIANCE IN LOCATIONS TO WITHIN THE COLOR TARGET WHEREIN COLOR MEASUREMENT IS LESS ACCURATELY PERFORMED

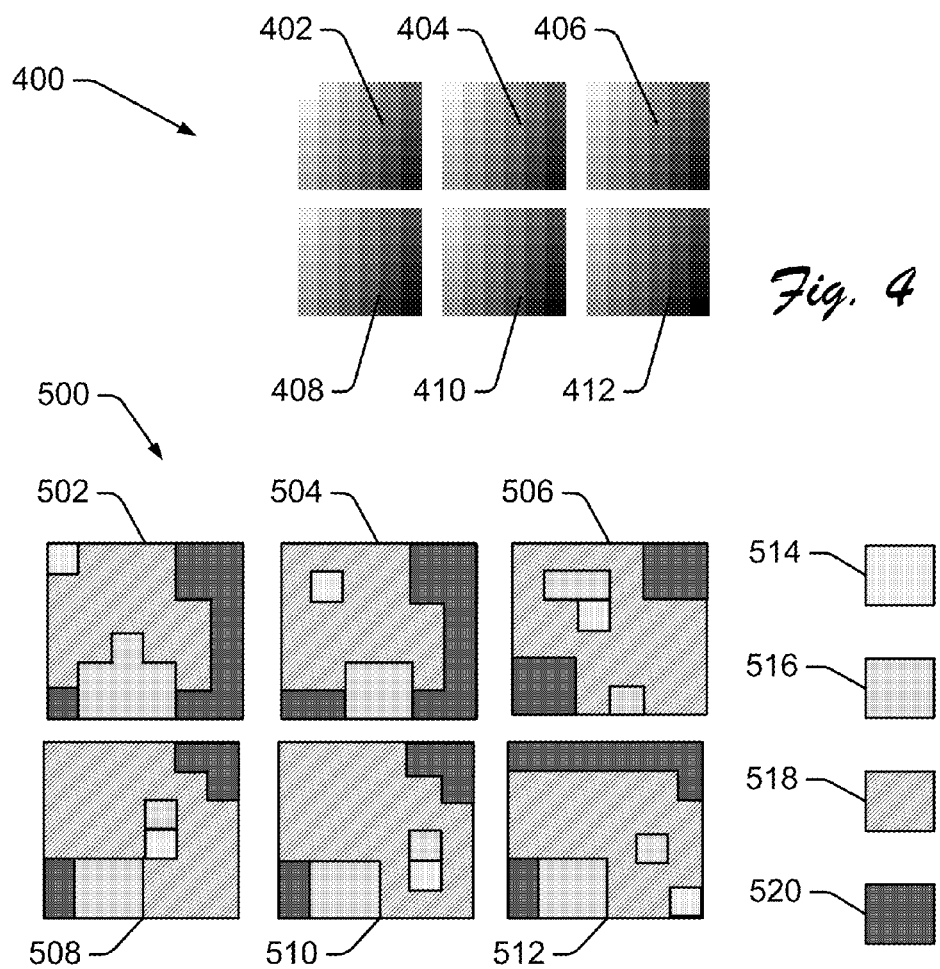
Fig. 4
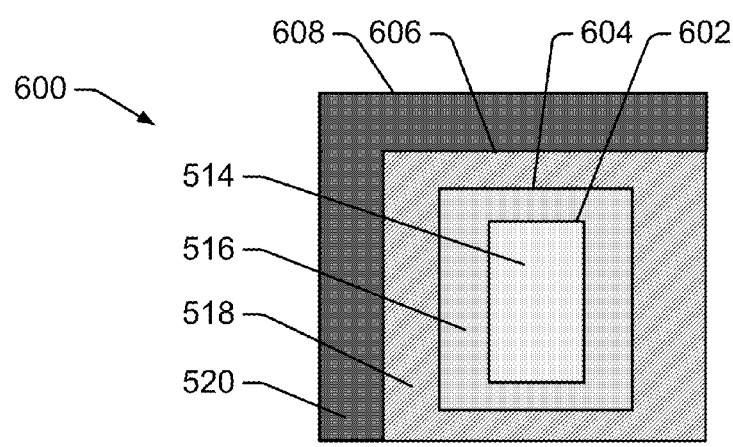
Fig. 5
Fig. 6

COLOR TARGET LAYOUT

BACKGROUND

Within a color printer, color-mapping is utilized to "map" input color data into "mapped color data,"which, when printed, results in output of a desired color. Thus, a color-mapping procedure, such as a look-up table, translates data to result in a closer match between input data and printed output. In many applications, one or more look-up table may be required, thereby enabling the printer to perform well using different types of print media and in different applications.

Color look-up tables can be created by a printer manufacturer. Typically, one or more color look-up tables are shipped with a color printer. Creation of the color look-up table involves several steps. A color target is printed without using a color look-up table. The color target typically includes a page of color print including a plurality of 'patches' printed in different colors. Colors in the color target are measured with a spectrophotometer, externally located with respect to the printer. A color look-up table appropriate to the media on which the color target was printed is then generated by appropriate software. The resulting color look-up table can then be installed on the printer.

Unfortunately, the color look-up table supplied with the printer may not completely satisfy the needs of every user. While a related color look-up table may be utilized in place of an unavailable color look-up table, this typically does not provide satisfactory results.

SUMMARY

A printer is configured to print a color target that associates colors to which humans are most sensitive to color variance with areas of the color target within which color measurement is less prone to measurement error. The printer then prints the color target according to the association. In an optional implementation, measurements of like color elements within the target are averaged. In a further optional implementation, the averaging is performed using weighted values, wherein the weighting is based on color measurement accuracy within an area within the color target wherein each measured element is located. In a still further implementation, a color look-up table is generated according to measurements made of the color target.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In the figures, the left-most digit(s) of a reference number identifies the figure in which the reference number first appears. The use of the same reference numbers in different figures indicates similar or identical items.

FIGS. 2A and 2B illustrate an example of a method by which colors to which humans are most sensitive to color variance are associated with areas within a color target wherein color measurement is less prone to error.

FIG. 4 illustrate six color targets configured according to prior art technology, without regard to differences in human sensitivity to color changes as a function of color hue, and without regard to variance of color measurement error within different parts of the color target.

FIG. 5 illustrates a representation of the six color targets of FIG. 4, wherein the colors have been replace by color types, which are related to human sensitivity to color change.

FIG. 6 illustrates an example of a color target wherein distribution of color types has been made according to the implementations of FIGS. 1-3, taking into account differing human sensitivity to variance of different color and to differing color measurement error within different parts of a color target.

DETAILED DESCRIPTION

Figure 1:
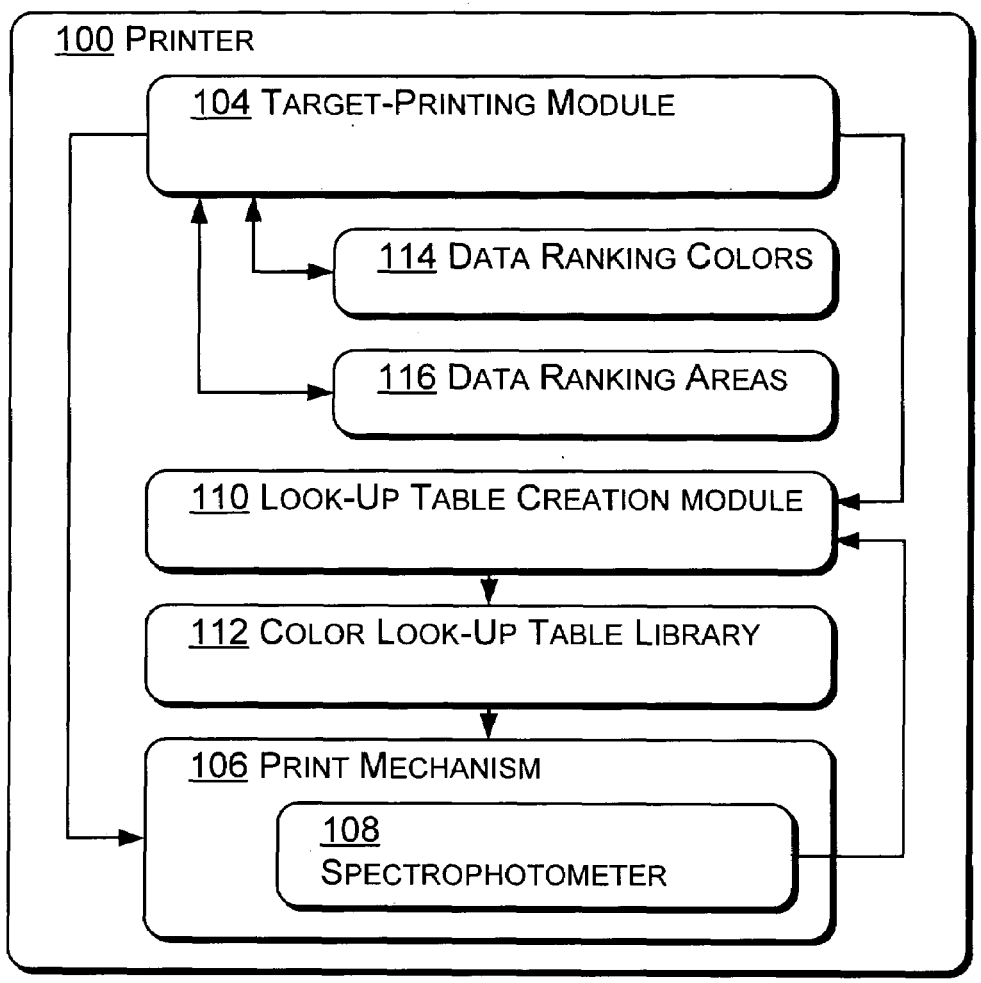
FIG. 1 illustrates an example of a printer configured to print a color target wherein colors to which humans are most sensitive to color variance are printed in areas of the color target wherein color measurement is less prone to error.
Figure 1:
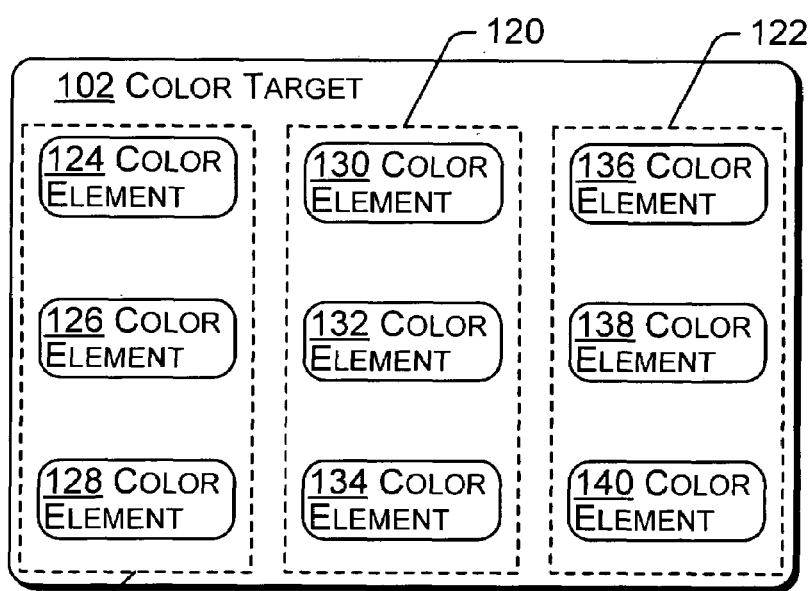

FIG. 1 illustrates an example of a printer 100 configured to print a color target 102. The example printer 100 includes a target-printing module 104 and a print mechanism 106. The target-printing module 104 is configured to associate colors to which humans are most sensitive to color variance with areas of the color target 102 wherein color measurement is less prone to error. A spectrophotometer 108, typically contained within the print mechanism 106, is configured to scan colors printed on the color target 102. Data output from the spectrophotometer 108 is sent to a look-up table creation module 110. The look-up table creation module 110 produces a color look-up table, in part by comparing the data used by target-printing module 104 to create the color target 102 with the measurements made by the spectrophotometer 108 of the color target. The color look-up table is then saved within a library 112 of color look-up tables.

The color target 102 includes two or more areas; for purposes of illustration, FIG. 1 shows three areas 118-122. In other applications, a greater or lesser number of areas could be defined. Within each of the areas 118-122, the color measurement error is expected to be similar. For example, the color measurement error in area 118 may consistently be less than the color measurement error in area 120, which in turn is less than the color measurement error in area 122. The color measurement error within each of the area 118-122 is in part dependent upon the construction and operation of the print mechanism 106, the spectrophotometer 108, and the print media itself. Thus, some areas of the color target 102 may have higher or lower expected measurement errors due to the interaction of the print mechanism 106, the spectrophotometer 108 and the print media upon which the color target 102 is printed.

The color target 102 additionally includes a variety of color elements 124-140. While only nine color elements 124-140 are shown by FIG. 1 for purposes of illustration, in most implementations, a much larger number of color elements would be printed. Each color element 124-140 could be configured as a patch of color printed on the color target 102. One or more color elements of each color included within the color target 102 may be printed in one or more of the areas 118-122, wherein different levels of color measurement accuracy are available. Where the color target 102 includes more than one color element 124-140 for any given color, the look-up table creation software 110 will be able to average values of several color elements measured by the spectrophotometer 108 to derive a color value. By printing color elements in more than one area 118-122, the look-up table creation software 110 will be able to weight the color values of each color element, based on the area 118-122 within which it was defined, during the averaging calculation. Color measurements made within areas having lower expected color measurement error can be more highly weighted.

The target-printing module 104 is configured to send data to the print mechanism 106, resulting in output of the color target 102. Accordingly, the target-printing module 104 determines a color of each of the color elements 124-140, and assigns each color element to an area 118-122. In one implementation, the target-printing module 104 is configured to access data 114 ranking colors according to human sensitivity to color variance and data 116 ranking areas according to expected color measurement error. This data, 114, 116, may be located within the target-printing module 104, or at any location, internal to or external from, the printer 100. Using the data 114-116, the target-printing module 104 is able to create, for immediate or later reference, data associating colors to which humans are most sensitive to color variance with areas of a color target within which color measurement is less prone to measurement error. The data 114 ranking colors includes data that ranks colors according to how easily human eyes are able to distinguish between subtle differences in shade. For example, slight changes in gray are much more easily recognized than slight changes in yellow. Thus, the ranking of colors 114 may be based on "physiological constructs" within the human eye and/or brain that cause people to be more able to recognize subtle variances in a first color as opposed to a second color. Alternatively and/or additionally, the ranking of colors may be based on "memory colors," such as various flesh tones, that people see repeatedly and of which they become sensitive to subtle variances. Additional memory colors include blues associated with the sky, and various greens associated with well-known vegetation. Thus, the data 114 ranking of colors may be based on physiological characteristics of human vision and/or memory colors common to human experiences.

The data 116 ranking areas according to expected color measurement error contains information describing how accurately different areas of the color target 102 will be measured by the spectrophotometer 108. For illustrative clarity, FIG. 1 shows the color target 102 configured to include three areas 118-122. Color measurement error of points within each of the areas is expected to be similar. For example, the color measurement error in area 118 may consistently be more than the color measurement error in area 120, while the color measurement error in area 122 may be intermediate between 118 and 120. In a typical implementation, the areas nearer edges of the color target 102 tend to have a greater color measurement error than interior areas of the color target. Additionally, areas adjacent a side of the color target to which ink is applied first (e.g. the left side when the printhead is moving left to right) tend to have a greater measurement error. However, the color measurement error associated with different areas of the color target 102 should usually be determined experimentally by the manufacturer. Having been determined, the information may be stored in data location 116 for use by the consumer and/or end user. Alternatively, the color target-printing module 104 may simply be configured to print memory colors and colors to which humans are most sensitive to color variance in areas known to have less color measurement error. Differences in the color measurement error between the three areas 118-122 could be due to aspects of interaction between the print mechanism 106 and the paper media, or other factors. The areas 118-122 are for purposes of illustration only. In most applications, more areas, and/or areas having more complex shapes would be utilized.

Additional implementations of the target-printing module 104 are possible. In one further implementation, data associating colors to which humans are most (least) sensitive to slight change and areas within the color target wherein color measurement is most (least) accurate is predefined. For example, results derived from routine experimentation performed in the course of designing the printer may be imbedded within the color target-printing module 104, or other local or remote location as required. Accordingly, data 114 ranking colors based on human color sensitivity and data 116 ranking areas within the color target based on color measurement error would be replaced by the predefined association between the colors and the areas.

The internal spectrophotometer 108 is typically located within the print mechanism 106, which is configured to operate the internal spectrophotometer in an automated manner. The internal spectrophotometer 108 is configured to measure color of ink applied to print media as the print media moves within a paper path defined within the print mechanism 106.

Figure 2B:
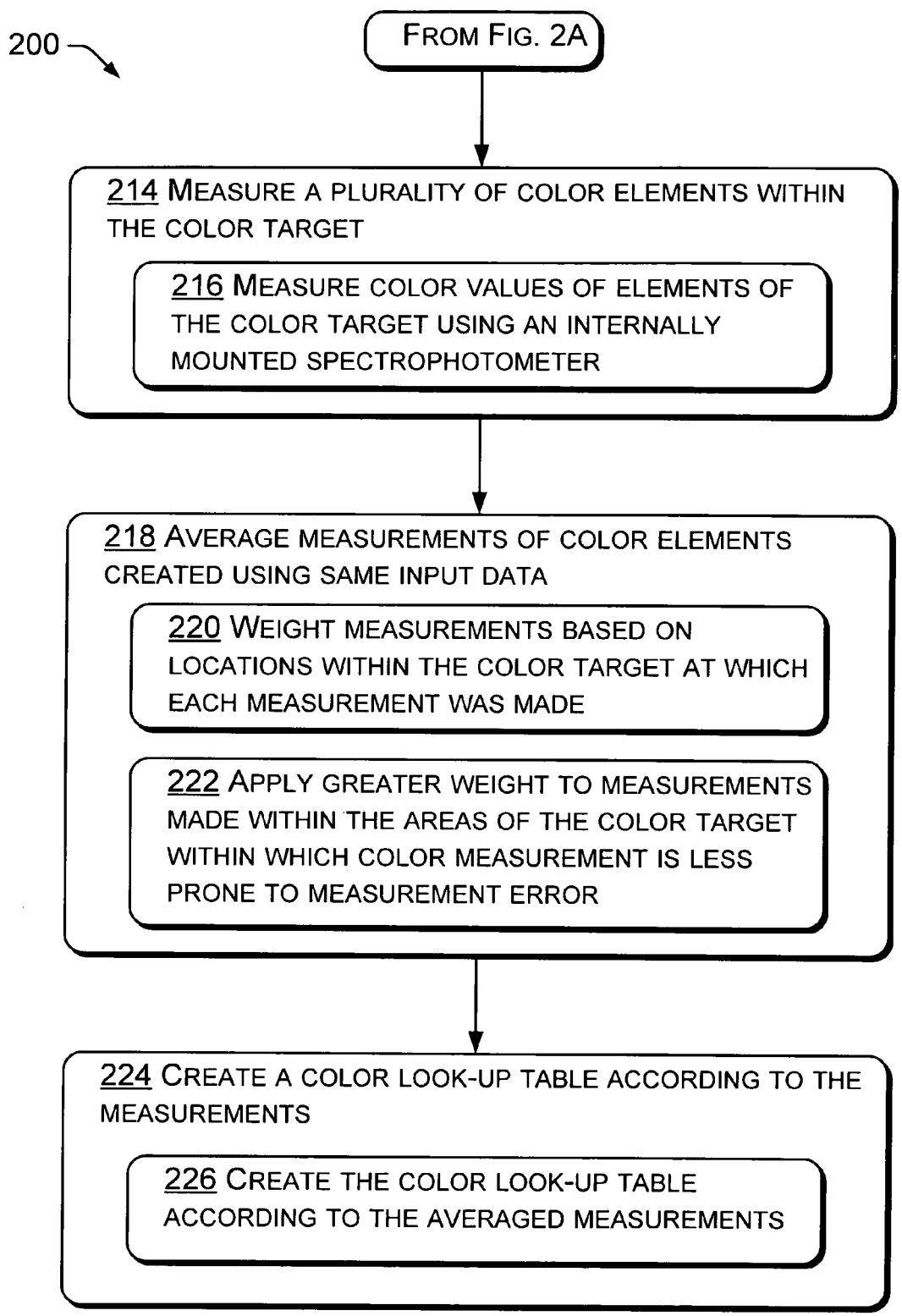

FIGS. 2A and 2B illustrate an exemplary method 200 by which a color target is printed, and by which a color look-up table may be generated. At block 202, colors to which humans are most sensitive to slight variations in hue, chroma or lightness are associated with areas of a color target within which color measurement is less prone to measurement error. In one implementation, the association of block 202 is made according to blocks 204-206. At block 204, data, which ranks colors based upon a degree to which human vision can detect color variance, is utilized. At block 206, data, which ranks areas within the color target based upon a degree of accuracy by which color measurement may be performed, is utilized. By utilizing the data ranking colors for human sensitivity to variance at block 204, and by utilizing the data ranking areas within the color target according to according to measurement accuracy at block 206, it is possible to associate the color sensitivity data with the color measurement accuracy data, and to print the color target so that the colors to which human vision is sensitive to variance are printed in the areas of the target within which measurement is most accurate.

A further implementation of the association of block 202 can be seen in FIG. 1. In particular, the target-printing module 104 associates data 114 ranking colors according to human sensitivity to slight color variance with data 116 ranking areas within the color target 102 according to color measurement error. In one example, the target-printing module 104 might associate colors, selected from data 114, to which human sensitivity to slight color variance is high with areas, selected from data 116, which are less prone to measurement error.

A further implementation of block 202 is possible. According to this implementation, data that associates colors according to human color sensitivities and areas according to color measurement errors could be preinstalled within the target-printing module 104. Thus, accessing data 114 ranking colors and data 116 ranking areas would not be necessary. Instead, data associating colors to which humans are most sensitive to color variance with areas of the color target within which color measurement is less prone to measurement error could be referenced directly. The referenced data could be installed within the target-printing module 104 or in another location, as is found to be practical.

At block 208, the color target is printed according to the association of colors and areas established at block 202. A particular implementation of block 208 is seen at blocks 210-212. At block 210, colors to which humans are more sensitive to color variance are printed in locations within the color target wherein color measurement can be more accurately performed. Similarly, at block 212, colors to which humans are less sensitive to color variance are printed in locations within the color target wherein color measurement is less accurately performed.

Referring briefly to FIG. 1 to illustrate an example of blocks 208-212, it can be seen that colors to which humans are sensitive to small variances, such as shades of gray, could be printed within an area (e.g. area 120) within which color measurements are more accurately made. Similarly, colors to which humans are less sensitive to small variances, such as shades of yellow, could be printed within an area (e.g. area 118) within which color measurements are less accurately made.

Referring again to FIG. 2 and more particularly to block 214, a plurality of color elements within the color target are measured. In the implementation of block 216, the color elements are measured using an internally mounted spectrophotometer. Referring to FIG. 1 for an example implementation of blocks 214-216, the spectrophotometer 110 is configured to measure color elements 124-140 defined on the color target 102.

In an optional implementation seen at block 218, measurements of color elements created using similar input data are averaged. Averaging measurements of color elements that are supposed to be the same color tends to provide a more accurate estimate of the actual color. In a variation on this implementation seen at blocks 220-222, the measurements are weighted before averaging. The weighting of the measurements can be based on locations within the color target at which each measurement was made. Referring to FIG. 1 for an example of how block 220 can be implemented, it can be seen that there are three areas 118-122 within the color target 102. Because the accuracy of color measurements made in each of the areas 118-122 can be different, a different weight could be assigned to the color elements 124-140, according to which area the measured color element is located. As an example of this, which is seen at block 222, greater weight may be given to measurements made within areas of the color target within which color measurement is less prone to measurement error.

At block 224, a color look-up table is created according to the measurements of the color elements 124-140, in view of the color data used to print the color elements. Referring to FIG. 1, an example of the operation of block 224 can be seen. The color look-up table creation module 110 receives input data from the spectrophotometer 108 and the target-printing module 104. Therefore, the color look-up table creation module 110 has access to both the data sent to the print mechanism 106 by the color target-printing module 104 and also the color measurements made by the spectrophotometer 108 of the resulting color target 102. Accordingly, the color look-up table creation module 110 is able to create a color look-up table that will map color data sent to the print mechanism 106 to result in better output when printed on the type of print media on which the color target 102 was printed. Once produced, the color look-up table can then be stored within the color look-up table library 112.

In a particular implementation seen at block 226, the color look-up table may be created according to averaged measurements, such as those of blocks 218-222. In the example implementation of FIG. 1, the averaged measurements result from averaging the measurements made by the spectrophotometer 108 of two or more color elements 124-140 resulting from the same input data. By averaging the measurements, the impact of aberrational data is minimized.

Figure 3:
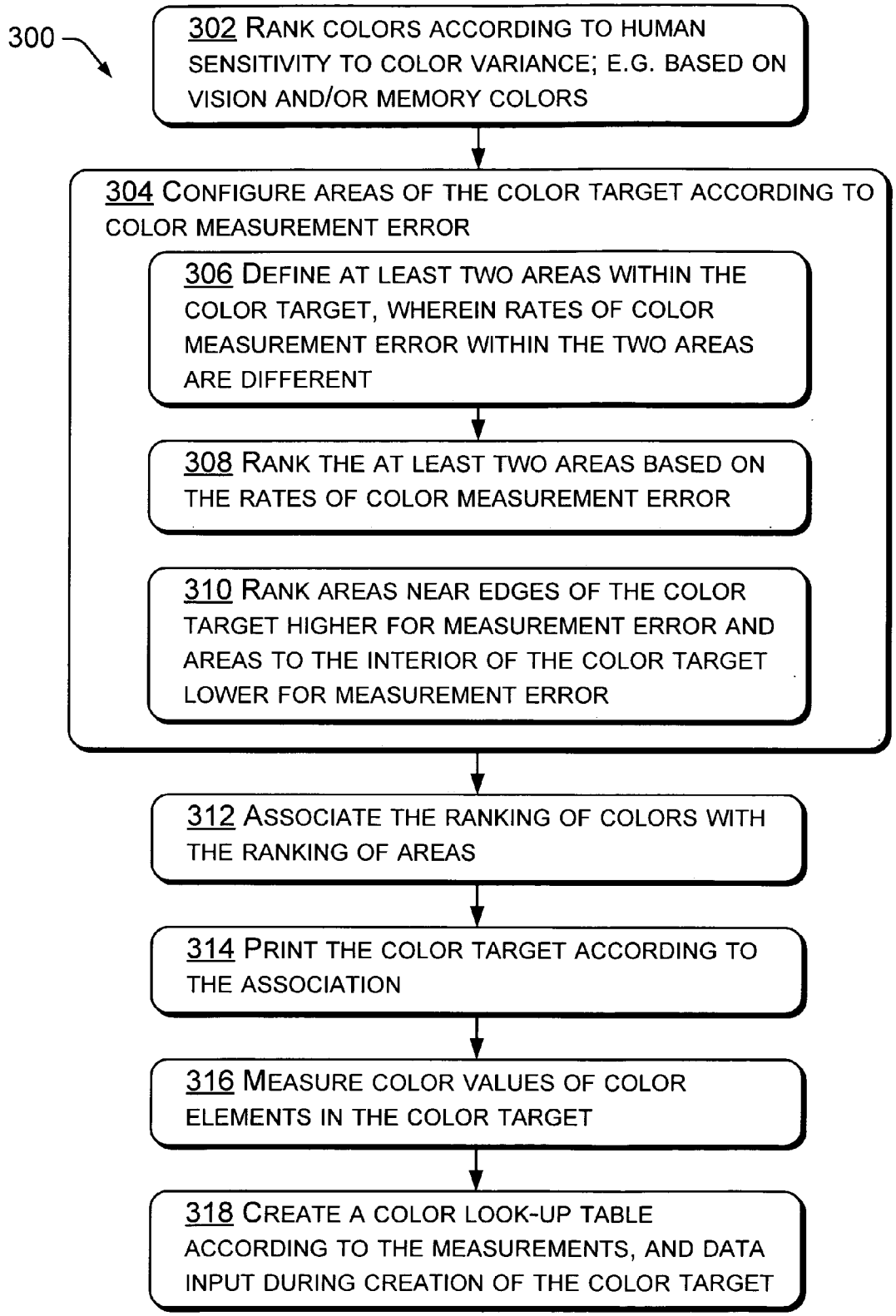
FIG. 3 illustrates a second example of a method by which colors to which humans are most sensitive to color variance are associated with areas within a color target wherein color measurement is less prone to error.

FIG. 3 illustrates illustrate a second exemplary method 300 by which a color target is printed. At block 302, colors to which humans are most sensitive to color variance are ranked. This ranking may be determined experimentally. For example, different colors may be varied by various amounts, and human perception of these changes can be tested. In the example of FIG. 1, this ranked data may be stored at data 114. At block 304, areas of the color target are configured according to color measurement error and/or expected color measurement error. Referring briefly to FIG. 1, it can be seen that this data may be stored at data 116. An example implementing the ranking of block 304 is seen at block 306-308 of FIG. 3. Block 310 provides an alternate implementation by which the ranking of block 304 may be performed. At block 306, at least two areas within the color target are defined, wherein the rates of color measurement error within the two areas are different. Referring to FIG. 1, the three areas 118-122 all represent areas within which the rate of color measurement error are different. At block 308, the at least two areas defined at block 306 are ranked, based on rates of color measurement error. In the example of FIG. 1, the areas could be ranked from first to third, wherein area 118 has the most (or least) measurement error, and area 122 has the least (or most) measurement error. At block 310, areas near edges of the color target are ranked higher for measurement error, and areas to the interior of the color target are ranked lower for measurement error. Accordingly, block 310 is intended as an example of a printer-specific implementation, wherein a specific printer, as a result of its construction and other factors, prints the color target more accurately in the interior areas (e.g. areas 120 of FIG. 1) and less accurately in regions adjacent to edges of the color target (e.g. areas 118 and 122 of FIG. 1). At block 312, the ranking of colors is associated with the ranking of areas. For example, colors to which humans are more sensitive to color variance are associated with areas having a greater accuracy of color measurement. Similarly, colors to which humans are less sensitive to color variance are associated with areas having less accuracy of color measurement. As an example, memory colors and colors to which humans are most sensitive to variance may be associated with interior areas of the color target that may have a greater accuracy of color measurement. Other colors may be associated with areas of the color target that are adjacent to edges of the color target that may have a lesser accuracy of color measurement. At block 314, the color target is printed according to the association. By printing colors to which humans are more sensitive to color variance in areas within which color measurement is more accurate, the look-up table creation module 110 will create a more effective color look-up table. Such a table will result in better control over colors to which humans are more sensitive to color variance. At block 316, color values of color elements within the color target are measured. Such measurements are made by the spectrophotometer 108. At block 318, a color look-up table is created according to the measurements and data input during creation of the color target. In the example of FIG. 1, the look-up table creation module 110 creates a color look-up table using knowledge of the input data used to print the color target, as well as the measurement data made of the printed color target.

The methods 200, 300 may be performed according to any desired means, such as by execution of computer- and/or processor-executable statements contained on a computer and/or processor-readable media by a computer and/or processor contained within a printer, server or work station. A "processor-readable medium," as used herein, can be any means that can contain or store instructions for use by or execution by a processor and/or computer. A processor-readable medium can be, without limitation, an electronic, magnetic, optical, electromagnetic, or semiconductor system, apparatus, or device. More specific examples of a processor-readable medium include, among others, a portable computer diskette, a random access memory (RAM), a read-only memory (ROM), an erasable programmable-read-only memory (EPROM or Flash memory), a rewritable compact disc (CD-RW), and a portable compact disc read-only memory (CDROM). While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

FIG. 4 illustrates a printout 400 including six color targets 402-412 configured according to prior art technology. In particular, the color targets were configured without regard to variances in human sensitivity to color changes as a function of color and/or color type. Additionally, the color targets were configured without regard to placement of colors as a function of color measurement error, such as by a sensor, within different areas of the color target.

FIG. 5 illustrates a diagram 500, wherein the six color targets of FIG. 4 have been replaced by diagrams 502-512 configured to group the colors of FIG. 4 into four color groups or 'color types,' including neutral colors 514, memory colors 516, high chroma colors 520 and other colors 518. In particular, neutral colors 514 include those colors, such as grays, to which the human eye is very sensitive to color change. Such colors do not exhibit hue, and have zero (or low) chroma (e.g. grays). Of the four color classes herein distinguished, humans are most able to sense variations in such colors. Humans are almost as sensitive to subtle changes in memory colors 516. Memory colors are colors that are repeatedly viewed by individuals, and because of this, subtle changes may be noticed. Examples of memory colors include the colors of the sky, various plants and various skin tones. Humans are least sensitive to subtle changes in high chroma colors 520. High chroma colors are those that have a chroma greater than about ⅔ of a color gamut cusp's chroma at the same hue. That is, given a color gamut (such as the color gamut obtainable using a given set of a printer, inks and media) a color C is of high chroma if there exists a color M that has the same hue as C and is the most chromatic color of the gamut at that hue. Then C is of high chroma if the chroma of M is no greater than the chroma of C times 1.5 Humans are intermediately sensitive to subtle changes in other colors 518, not listed above.

FIG. 6 shows an example of a color target 600 for evaluating print output, including print output defined on a print media, such as paper. The color target 600 includes a plurality of regions wherein colors of each of the color types are located according to the implementations of FIGS. 1-3. In particular, an area 602 is defined within a region of the color target wherein color measurement error (such as by a sensor) is minimal. Within area 602, neutral colors 514 to which humans are most sensitive to color variance are printed. Similarly, an area 604 is defined within a region of the color target wherein color measurement error is low, but greater than the error of area 602. Within area 604, memory colors 516 to which humans are also sensitive to subtle variances are printed. An area 608 is defined within a region of the color target wherein color measurement error is greater. Within area 608, high chroma colors 520 are printed. An area 606 is defined within a region of the color target wherein color measurement error is intermediate. Within area 606, other colors 518, to which humans are intermediately sensitive to subtle variations, are printed. Note that the relative sizes and locations of the areas 602-608 could vary according to the printer, and the characteristics of the illustration shown is for purposes of discussion only. As a practical matter, color measurement error is frequently greatest at the top and edges of the color target, and least in central portions of the color target.

Although aspects of this disclosure include language specifically describing structural and/or methodological features of preferred embodiments, it is to be understood that the appended claims are not limited to the specific features or acts describe. Rather, the specific features and acts are disclosed only as exemplary impementations, and are representative of more general concepts.

The invention claimed is:

1. One or more processor-readable media comprising processor-executable instructions for printing a color target, the processor-executable instructions comprising instructions for:
   associating colors to which humans are most sensitive to color variance with areas of the color target within which color measurement is less prone to measurement error;
   printing the color target according to the association;
   measuring a plurality of color elements within the color target;
   averaging measurements of color elements made using similar input data wherein the averaging comprises instructions for:
      weighting measurements based on locations within the color target at which each measurement was made;
      wherein greater weight is given to measurements made within the areas of the color target within which color measurement is less prone to measurement error; and
   creating a color look-up table according to the averaged measurements.

2. The one or more processor-readable medium as recited in claim 1, wherein the associating is performed according to instructions for:
   ranking colors based upon a degree to which human vision can detect color variance; and
   ranking areas within the color target based upon a degree of accuracy by which color measurement may be performed.

3. The one or more processor-readable medium as recited in claim 1, wherein the associating is performed according to instructions for:
   ranking colors according to human sensitivity to color variance;
   ranking areas of the color target according to color measurement error; and
   associating the ranked colors with the ranked areas.

4. The one or more processor-readable medium as recited in claim 1, wherein the printing comprises instructions for:
   printing colors to which humans are more sensitive to color variance in areas within the color target wherein color measurement can be more accurately performed; and
   printing colors to which humans are less sensitive to color variance in areas within the color target wherein color measurement is less accurately performed.

5. The one or more processor-readable medium as recited in claim 1, additionally comprising instructions for:
   measuring color values of elements of the color target using an internally mounted spectrophotometer; and
   creating a color look-up table according to the measuring.

6. A printer configured for printing a color target, the printer comprising:
   a spectrophotometer configured to make a plurality of measurements of color elements within the color target;

a target-printing module configured to associate colors to which humans are most sensitive to color variance with areas of the color target within which the spectrophotometer is less prone to color measurement error; and a print mechanism configured to print the color target according to the association.

7. The printer as recited in claim 6, additionally comprising:

a look-up table creation module to receive input data from the spectrophotometer and to create a color look-up table according to the input data.

8. The printer as recited in claim 7, wherein the look-up table creation module is additionally configured for:

averaging measurements of color elements, created using similar input data, from among the plurality of measurements; and weighting the plurality of measurements of color elements when averaging, based on locations within the color target at which each measurement was made, such that greater weight is given to measurements made within the areas of the color target within which color measurement is less prone to measurement error.

9. The printer as recited in claim 6, wherein the target-printing module is additionally configured for:

utilizing data which ranks colors based upon a degree to which human vision can detect color variance; and utilizing data which ranks areas within the color target based upon degree of accuracy by which color measurement may be performed.

10. The printer as recited in claim 6, wherein the target-printing module is additionally configured for:

ranking colors according to human sensitivity to color variance;

ranking areas of the color target according to color measurement error; and associating the ranked colors with the ranked areas.

11. The printer as recited in claim 6, wherein the target-printing module is additionally configured for:

printing colors to which humans are more sensitive to color variance in locations within the color target wherein color measurement can be more accurately performed; and printing colors to which humans are less sensitive to color variance in locations within the color target wherein color measurement is less accurately performed.

12. The printer as recited in claim 6, wherein the look-up table creation module is additionally configured for measuring color values of elements of the color target using an internally mounted spectrophotometer and creating a color look-up table according to the measuring.

13. A method for printing a color target, comprising:

ranking colors according to human sensitivity to color variance;

ranking areas of the color target according to color measurement error wherein the areas are ranked to include areas of less color measurement error and areas of more color measurement error, and wherein the color measurement error within each area is defined by error resulting from operation of a sensor scanning the print media;

associating the ranked colors with the ranked areas; and printing the color target according to the association.

14. The method as recited in claim 13, additionally comprising:

measuring a plurality of color elements within the color target; and averaging measurements of color elements made using same input data; and creating a color look-up table according to the averaged measurements.

15. The method as recited in claim 14, wherein the averaging comprises:

weighting measurements based on locations within the color target at which each measurement was made;

wherein greater weight is given to measurements made within the areas of the color target within which color measurement is less prone to measurement error.

16. The method as recited in claim 13, wherein ranking colors according to human sensitivity to color variance comprises:

ranking colors according to physiological characteristics of human vision, and according to memory colors common to human experiences.

17. The method as recited in claim 13, wherein ranking areas of the color target comprises:

defining at least two areas within the color target, wherein rates of color measurement error within the two areas are different; and ranking the at least two areas based on the rates of color measurement error.

18. The method as recited in claim 13, additionally comprising:

measuring color values of elements of the color target using an internally mounted spectrophotometer; and creating a color look-up table according to the measuring.

19. The method as recited in claim 13, wherein configuring areas of the color target comprises:

assigning a rank indicating higher expected color measurement error to areas adjacent edges of the color target; and assigning a rank indicating lower expected color measurement error to interior areas of the target.

20. The method as recited in claim 13, wherein associating the ranked colors with the ranked areas comprises:

associating memory colors and colors to which humans are most sensitive to variance to interior areas of the color target; and associating other colors to areas adjacent edges of the color target.

* * * * *